United States Patent [19]

Chanoni et al.

[11] Patent Number: 5,276,974
[45] Date of Patent: Jan. 11, 1994

[54] UNIT FOR CONTINUOUSLY MEASURING SHAPE DEFECTS OF A PART, AND MEASURING PROCESS USED IN THIS UNIT.

[75] Inventors: Antoine Chanoni, rue du Haras; Alain Hourdel, Forges Les Bains; Gerard Villette, Allee des Bocages, all of France

[73] Assignee: Regie Nationale des Usines Renault, Societe Anonyme, Boulogne Billancourt, France

[21] Appl. No.: 707,563

[22] Filed: May 30, 1991

[30] Foreign Application Priority Data

May 30, 1990 [FR] France .................. 90 06730

[51] Int. Cl.$^5$ .................................. G01B 5/03
[52] U.S. Cl. ................................. 33/503; 33/546; 33/554; 33/562
[58] Field of Search ............. 33/503, 545, 546, 553, 33/554, 562

[56] References Cited

U.S. PATENT DOCUMENTS

| | | | |
|---|---|---|---|
| 2,623,293 | 12/1952 | Nebaae et al. | 33/545 |
| 3,400,463 | 9/1968 | Barringer | 33/546 |
| 3,739,262 | 6/1973 | Seekins | 33/546 |
| 4,070,762 | 1/1978 | Siddell | 33/545 |
| 4,473,953 | 10/1984 | Sauvale | 33/546 |
| 4,477,973 | 10/1984 | Davies . | |
| 4,603,487 | 8/1986 | Matsunata | 33/503 |
| 4,622,756 | 11/1986 | Mardsen | 33/556 |
| 4,653,011 | 3/1987 | Iwano | 33/503 |
| 4,716,656 | 1/1988 | Maddock et al. | 33/503 |
| 4,769,763 | 9/1988 | Trieb et al. | 33/503 |
| 4,884,889 | 12/1989 | Beckwith Jr. | 33/503 |
| 4,932,131 | 6/1990 | McMurtry et al. | 33/503 |
| 4,961,267 | 10/1990 | Herzog | 33/503 |
| 5,016,199 | 5/1991 | McMurtry et al. | 33/503 |
| 5,040,306 | 8/1991 | McMurtry et al. | 33/503 |

FOREIGN PATENT DOCUMENTS

| | | | |
|---|---|---|---|
| 2-71215 | 11/1990 | Japan | 33/546 |
| 1231383 | 5/1986 | U.S.S.R. | 33/546 |
| 2197478 | 5/1988 | United Kingdom . | |
| 2203837 | 10/1988 | United Kingdom . | |

OTHER PUBLICATIONS

Journal of Physics E. Scientific Instruments, vol. 19, No. 7, Jul. 1986, pp. 495–501, New York, W. Lotze: "Precision Length Measurement by Computer-aided Coordinate Measurement".

Machine Moderne No. 858, Paris, France; Sep. 1981, pp. 60–67, Y. Calvez: "Intégre la mesure dans la", p. 64, Col. 1.

WT Werkstattstechnik, vol. 78, No. 3, Mar. 1988, pp. 165–170, NFR, A. Weckenmann et al.: "Beurteilung der Genauigkeit von Formprüfger/e,uml/a/ ten", paragraphs 3.1, 3.2.

Patent Abstracts of Japan, vol. 6, No. 252 (p-161) (1130), Dec. 10, 1982; & JP-A 57148209 (Toyoda Koki K.K.) Sep. 13, 1982.

Primary Examiner—Thomas B. Will
Attorney, Agent, or Firm—Oblon, Spivak, McClelland, Maier & Neustadt

[57] ABSTRACT

A unit for measuring shape defects of a part includes an installation plane (1), a presentation unit (2) receiving part to be measured, a measuring machine (10) mobile along three axes (X,Y,Z) and equipped with a sensor (17), and a computer (20). The sensor continuously follows the shape of the part, the variations recorded by the sensor determining a fourth axis (W). Shape deviations are displayed based upon the instantaneous acquisition of the four measuring displacements.

6 Claims, 4 Drawing Sheets

UNIT FOR CONTINUOUSLY MEASURING SHAPE DEFECTS OF A PART, AND MEASURING PROCESS USED IN THIS UNIT.

BACKGROUND OF THE INVENTION

This invention relates to a unit for measuring shape defects of a part, and a measuring process used in such a unit.

In the case of a digitized left surface, a body part of a motor vehicle, for example, any point of this surface can be calculated as coordinates X, Y, Z in an orthonormed reference frame. The actual shape of the part, after production, differs slightly from the theoretical shape. It is therefore necessary to know the deviations existing between the theoretical shape and the actual shape, to modify the production conditions.

The known measuring units comprise a ground plane installation, called a surface plate below, on which is installed a presentation unit receiving the part to be measured, a three-dimensional measuring machine and a computer. The machine is equipped with a trigger sensor mounted on a head and three counters quantifying the displacements of the sensor along the three axes.

The process used in such known measuring units consists in placing the part on its display unit, then in sensing this part along a number of previously determined points. The operator manually displaces the sensor from point to point and at each point brings the sensor into contact on the part. The sensor then triggers the acquisition by the computer of the three values read by the counters. A comparison of the values read and processed by the computer with the theoretical values quantifies the defect of shape at a pinpointed location.

This measuring process is slow, because it is necessary to place the sensor straight above each predetermined point and to make a contact with the part to perform the acquisition of the three coordinates.

This process makes the analysis of the defects inaccurate, because the number of measured points is small. The increase of the number of measured points would require a long and costly preparation (range) and use.

SUMMARY OF THE INVENTION

This invention has as its object to make the measuring quicker because the preparation is shorter and the operator no longer has to search for measuring points, he constructs a range on the machine during the first sensing.

This invention also has as its object to make the analysis of the defects more reliable because it makes it possible to record a large number of points which provides a more precise evaluation of the actual shape.

This invention has as its object a unit for measuring shape defects of a part, comprising an installation plane, a presentation unit receiving the part to be measured, a measuring machine mobile along three axes and equipped with a sensor, and a computer, characterized in that the sensor continuously follows the shape of the part, the variations recorded by the sensor determining a fourth axis, and in that it comprises means making possible the instantaneous acquisition of four measuring displacements.

The acquisition means are directly linked to the computer.

The sensor is a sensor with linear displacement. It is mounted on a head which can be oriented along two axes of rotation and the unit then comprises an initialization sensor which makes it possible to locate the sensor in space for the first use or after each removal.

The presentation unit or the surface plate can comprise a template which imposes a sensing trajectory, this template being used when the sensing trajectory is of any type.

This invention also has as its object a process of measuring shape defects of a part, consisting in placing the part on a previously oriented display unit, characterized in that it consists:

in determining a span between the various measuring points, in sensing the part in a continuous manner, in acquiring for each measured point, instantaneously and automatically on a computer, the four measuring displacements, the computer then determining the three coordinates of the measured point, and in comparing these three coordinates with the three theoretical coordinates of the point already stored in the computer.

BRIEF DESCRIPTION OF THE DRAWINGS

A unit according to the invention, as well as the process used, are described below by way of example and with reference to the accompanying drawings.

DETAILED DESCRIPTION OF THE PREFERRED EMBODIMENTS

Figure 1:
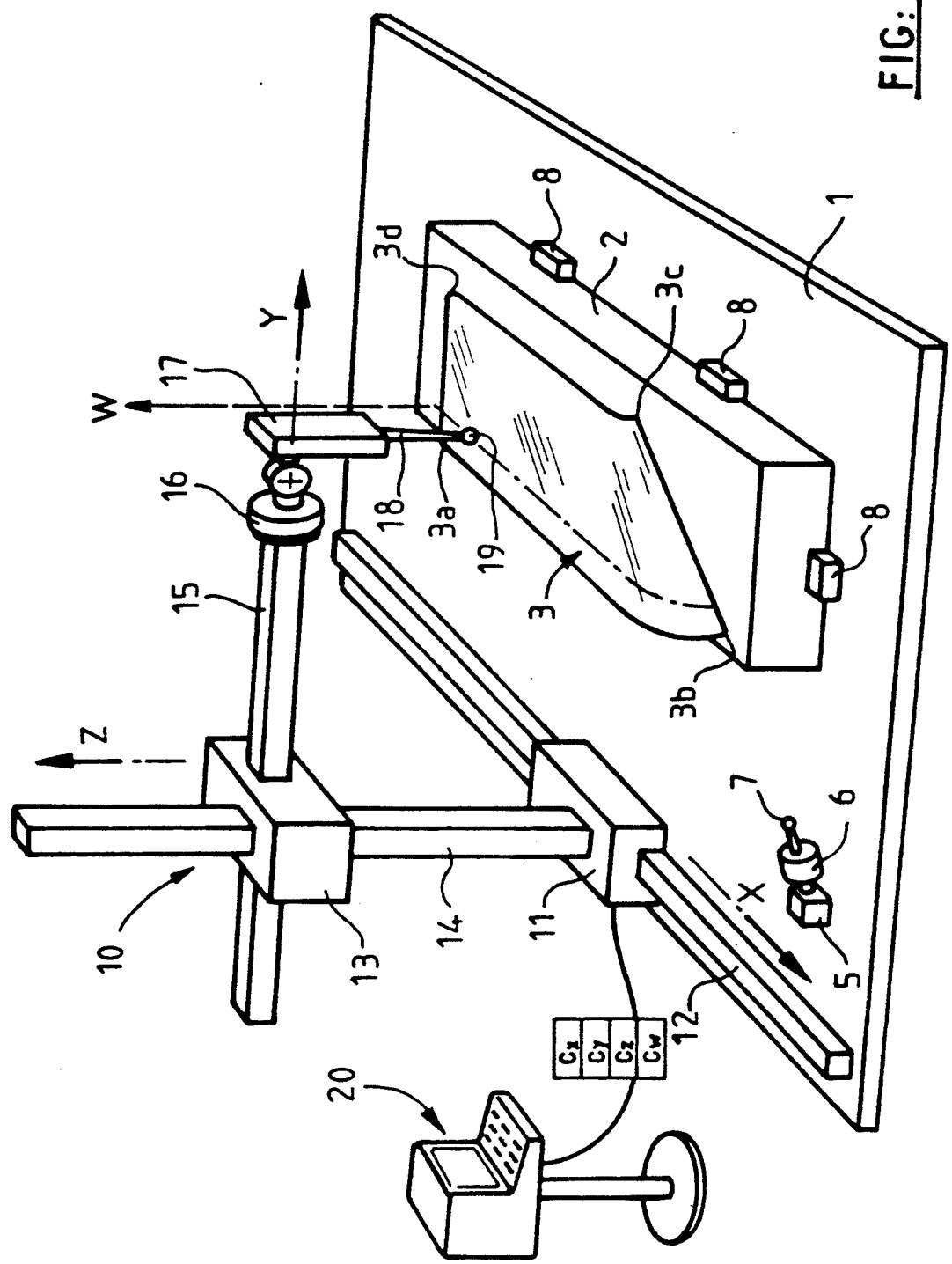
FIG. 1 represents a general view of the unit measuring a part, without use of a template.

As it is illustrated in FIG. 1, the unit comprises an installation plane or surface plate 1, a presentation unit 2, an initialization sensor 6, a measuring machine 10 and a computer 20.

The surface plate receives presentation unit 2 resting against blocks 8 and, on this display unit, there is installed a part 3 which, in this case, is a rear side window of a motor vehicle.

The surface plate also receives a base 5, on which initialization sensor 6 is installed in a fixed manner in space.

The measuring machine comprises a first base 11 sliding horizontally along a guide bar 12 integral with the surface plate and defining an X axis, a second base 13 sliding along a vertical column 14 attached to base 11 and defining a Z axis, a horizontal arm 15 sliding in base 13 and defining a Y axis, a head 16 equipped with a sensor 17 measuring along the W axis, three optoelectronic guide bars (not shown), and four counters CX, CY, CZ, CW corresponding respectively to the X, Y, Z and W axes.

Figure 2:
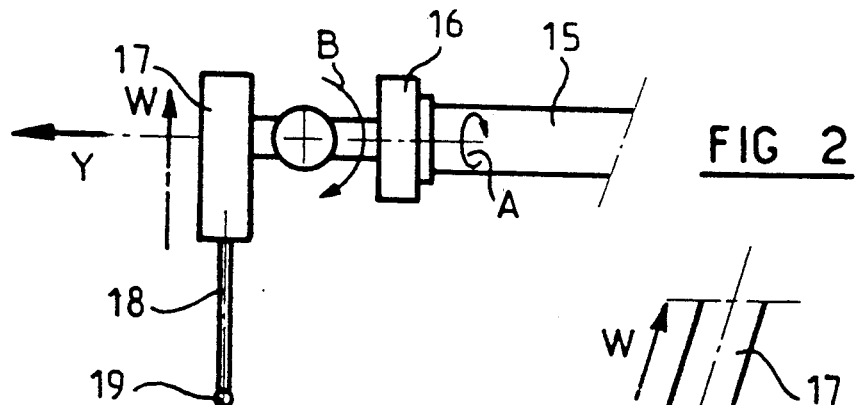
FIG. 2 represents, in greater detail, the head of the machine and its sensor.

Head 16 and sensor 17 can be seen better in FIG. 2. This FIG. 2 shows that head 16 can be oriented along two possible axes of rotation, one rotation around the Y axis, along an angle A, and one rotation around an axis parallel to the X axis, along an angle B. Sensor 17 can thus occupy different positions in space to be oriented approximately perpendicular to the part to be measured. This head with two axes offers about forty positions, each of which can be indexed and perfectly repeated. The sensor comprises a slide 18 with linear displacement (for example, between 25 mm and 100 mm) whose contact 19 is constantly resting on the part by a spring, which makes this sensor suitable for continuous measuring. This mode of use will be called "the continuous mode."

Contact 19 is a ball, in this case. This ball provides a good accessibility when concave shapes are being measured, but it is sensitive to the roughness of the surface to be sensed. The contact can also be a roller, because a roller is better suited when a rough surface is being measured.

Figure 4:
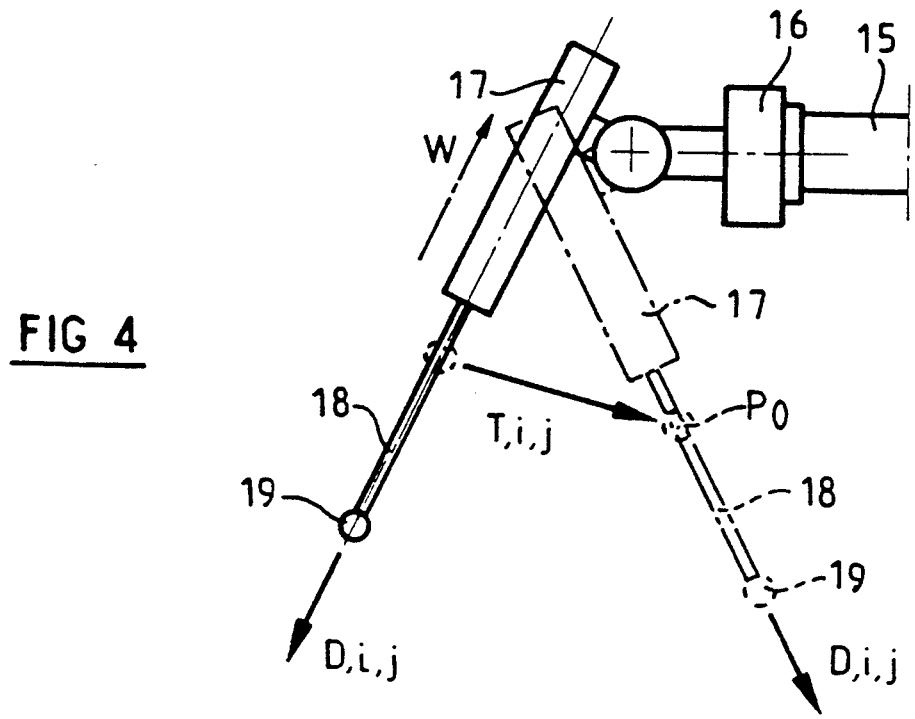
FIG. 4 represents another stage in which a change of position of the sensor has been performed.

This sensor comprises an electrical zero (see FIG. 4: point po), which makes it possible to use it as a trigger sensor to perform the operation of adjusting the part described below. This mode of use will be called "the triggering mode."

The installation of the unit, first or after each removal, requires an initialization phase of the head.

Figure 3:
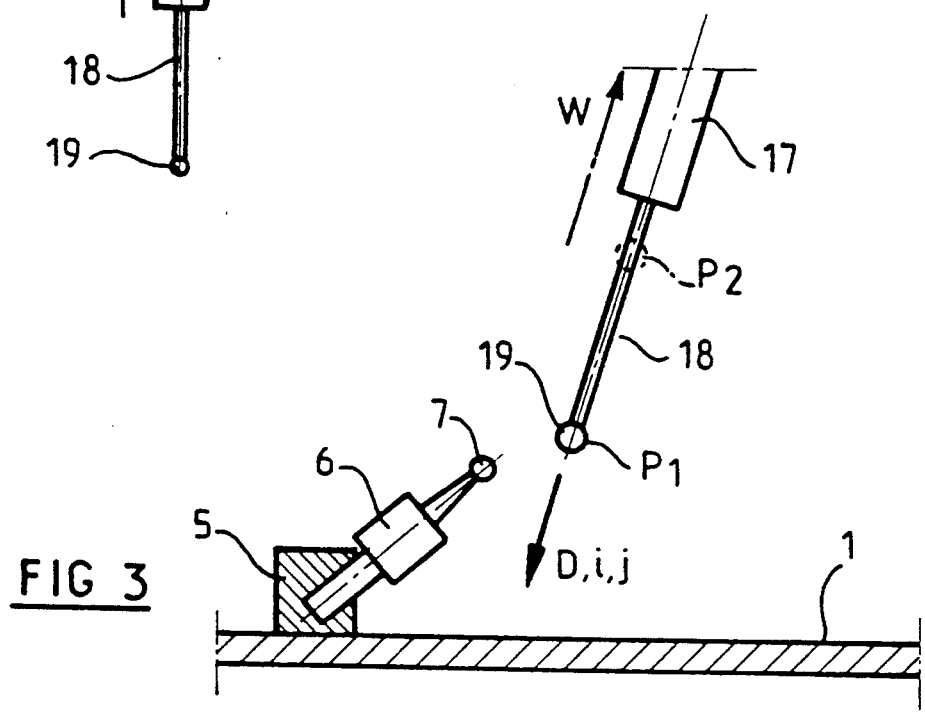
FIG. 3 represents a particular stage of the initialization of the sensor.

The initialization operation consists first in determining the position of the center point of ball 19 in space (which involves a correction perpendicular to the sensed shape of a diameter d/2), then in knowing the direction of vector D,i,j of slide 18, this direction being determined (see FIG. 3), by a sensing of several points (between 5 and 50) of sphere 7 of initialization sensor 6 by ball 19, in the two locked positions of the slide (P1: low position, and P2: high position) and by a calculation of vector D,i,j of origin P2 and end P1. If the orientation of the sensor should be changed during sensing, the direction of translation vector T,i,j (see FIG. 4) between position i,j of FIG. 3 and the reference position at the electrical zero (point PO) should be known.

The measurement of a part requires the adjustment of the display unit, or of the part itself, to associate the machine frame of reference with the part frame of reference.

The operation of isostatic or hyperstatic adjustment consists in sensing the presentation unit, or the part, with the sensor in triggering mode.

The measurement according to the invention is made in the following manner.

The part to be measured is positioned on the presentation unit. The part is sensed by remaining in permanent contact with the latter and the slide is displaced by a value d along the W axis. The acquisition of data is performed along a chosen span and each span cleared triggers the acquisition by the computer of four values displayed on the counters. A span can be between 0.1 mm and 100 mm. A distance less than 0.1 mm would have an unnecessary precision and a distance greater than 100 mm is not consistent with a measurement in continuous mode.

Each counter manages a span, not in curved abscissa of the trajectory, but along one of the X, Y, Z machine axes.

It is important that the buffer memory of the counter does not overflow because of a too quick sensing speed. The computer therefore will emit a sound signal at all the n points (n being a function of the chosen span and the size of the buffer memory). If the sound signal is discontinuous, the rate of displacement is correct, and there is no risk of overflow of the memory. But if the sound signal becomes too continuous, the operator then knows that he should slow down the rate of displacement of the sensor.

The four counters give to the computer a series of four data items consisting of coordinates X, Y, Z of the measuring machine and of value d of the displacement of the slide along the W axis. The computer deduces from them the three coordinates of each measured point. Since it knows the theoretical coordinates of each measured point, it displays on a tracing table the theoretical curve and the measured curve which optionally show the defects in an amplified manner.

Figure 5:
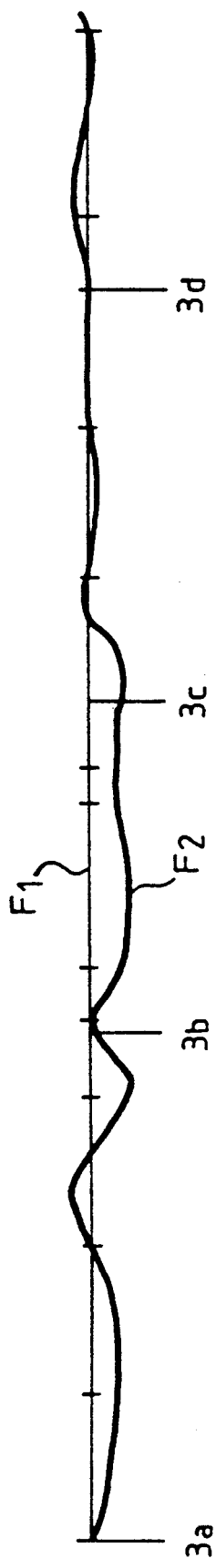
FIG. 5 is a graph which shows the shape defects obtained on such a part.

Curve F1 of FIG. 5 is the theoretical curve of the circumference of part 3 and curve F2 is the actual, i.e., measured, curve, with four characteristic points 3a, 3b, 3c, 3d of part 3, these four points being visible in FIG. 1. The deviations of dimensioning are thus directly visible on this graph.

Figure 6:
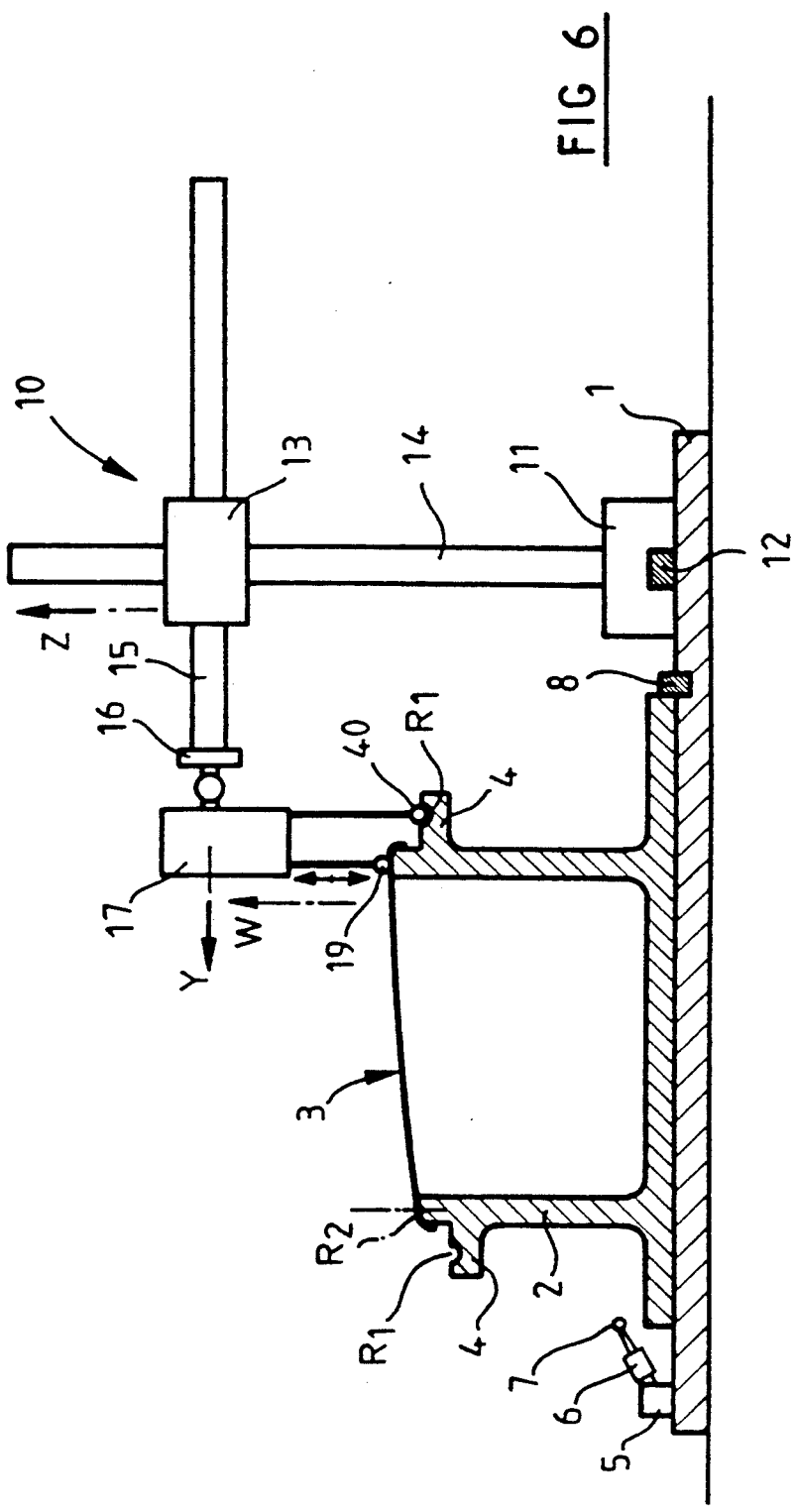
FIG. 6 shows another general view of the unit measuring another part with use of a template.

FIG. 6 shows a unit in which the display unit receives a part 3 of a complex circumference which in this case is a door of a motor vehicle. For this type of part, it is preferable to use a template 4 attached to presentation unit 2 to make possible a perfectly repeatable sensing passage. This template 4 makes it possible to follow more easily the circumference of the part. A pin 40 is engaged in a path defining means e.g., a groove, R1 of the template, while ball 19 of the sensor follows the surface that it is desired to measure.

Figure 7:
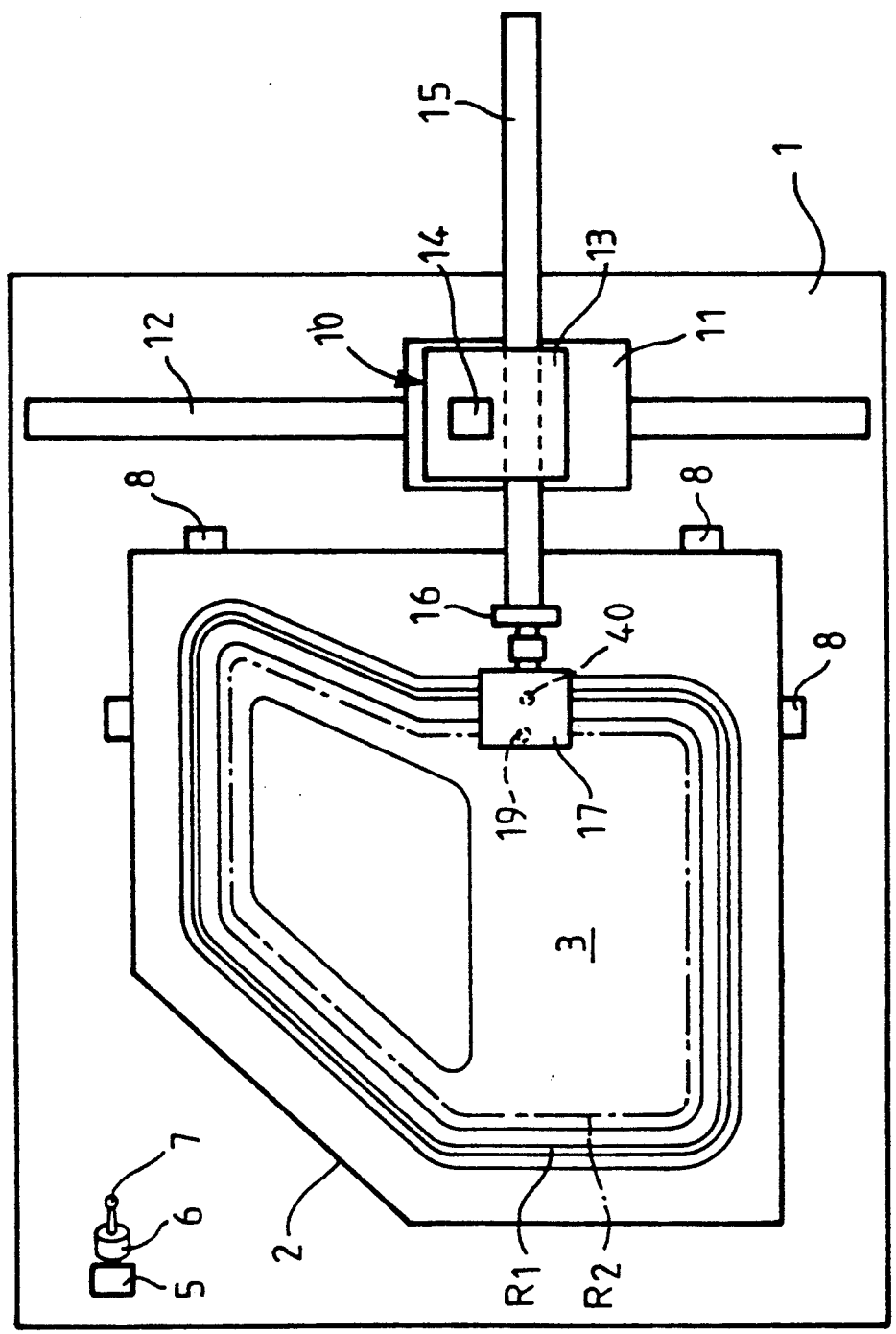
FIG. 7 is a top view of FIG. 6.

FIG. 7, which is a top view of FIG. 6, shows path defining means R1 followed by pin 4 and path R2 followed by ball 19.

The computer makes possible a statistical processing. The organization of the file will make possible a management of the measuring results. This management makes it possible to know or to influence preventively the various production parameters.

The two examples which have just been described relate to the measurement of shape defects of a part, but the unit and the process of the invention could also be used as assistance for the designers working with computer-aided design (CAD). In this case, the measurement would be made upstream from the design, directly on a plaster shape made by the designers. This predigitization could provide a saving of time, on the order of 30%.

The unit and the process of the invention could also make possible the verification of the quality of machining centers with numerical control during their reception. Actually, by placing four or five parts in the usable space of the machine with numerical control, by machining the latter in the same manner, and by replacing them in an identical manner on the table of the measuring machine, the influence of the bendings and the vibrations to which the arms of the machine with numerical control are subjected could be known.

We claim:

1. A measuring unit for measuring shape defects of a part, comprising:
   an installation plate;
   a presentation unit positioned on said installation plate, and upon which a part to be measured may be placed;
   a measuring unit comprising:
   (a) a measuring head,
   (b) means for moving the measuring head in at least one of three orthogonal directions along a path corresponding to a desired part shape, and
   (c) a sensor mounted to the head and linearly displaceable relative to the head along a sensor axis, whereby movement of said measuring head by said moving means with said probe in contact with said part causes said sensor to be displaced; and a computer responsive to the displacement of said sensor and comprising means for calculating the coordinates of substantially each point along said path and for continuously displaying deviations between said desired part shape and an actual part shape at substantially each point along said path, wherein said presentation unit includes a template having path defining means for defining the path followed by the head, and wherein said head includes an element cooperating with said path defining means, whereby the head follows the path.

2. The measuring unit of claim 1 including an initiation sensor.

3. The measuring unit of claim 1, wherein said path defining means comprises a groove and wherein said element of said head comprises a pin fittable in the groove.

4. A method of measuring shape defects of a part, comprising the steps of:

placing a part on a presentation unit;

moving a measuring head along a continuous path in proximity to said part, said head having a probe in contact with said part and linearly displaceable with respect to said head;

recording a value of a probe displacement for points on said path;

calculating the coordinates of said points; and calculating and continuously displaying a deviation of the actual part shape from the desired part shape for points on said path, wherein said moving step comprises placing an element of the head cooperating with a path defining means of a template on the presentation unit, and guiding the element relative to the path defining means.

5. The method of claim 4 wherein the part to be measured in a vehicle body part and wherein said desired shape is a computer modeled shape.

6. The method of claim 4, wherein said moving step comprises placing a pin as said element of the head in a groove of the template on the presentation unit.

* * * * *